(12) United States Patent
Sung et al.

(10) Patent No.: US 7,697,712 B2
(45) Date of Patent: Apr. 13, 2010

(54) SPEAKER DEVICE FOR IMPROVING ANTENNA PROPERTY IN A WIRELESS PORTABLE TERMINAL

(75) Inventors: Hak-Jea Sung, Suwon-si (KR); Kyeong-Jun Kim, Yongin-si (KR); Jin-Sun Woo, Yongin-si (KR); Chang-Ki Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1131 days.

(21) Appl. No.: 11/304,097

(22) Filed: Dec. 15, 2005

(65) Prior Publication Data

US 2006/0204027 A1    Sep. 14, 2006

(30) Foreign Application Priority Data

Mar. 14, 2005  (KR)  ............... 10-2005-0021006

(51) Int. Cl.
*H04R 25/00*  (2006.01)

(52) U.S. Cl. ............... 381/409; 381/384; 381/408

(58) Field of Classification Search ............ 381/396, 381/399, 400, 401, 408, 409, 410, 431; 340/388.1, 340/388.3, 391.1
See application file for complete search history.

(56) References Cited

U.S. PATENT DOCUMENTS

| | | | | |
|---|---|---|---|---|
| 5,861,686 A | * | 1/1999 | Lee | .............................. 310/36 |
| 6,137,891 A | | 10/2000 | Porrazzo et al. | |
| 7,110,564 B2 | * | 9/2006 | Son | .............................. 381/396 |
| 2004/0171404 A1 | | 9/2004 | Annamaa et al. | |

FOREIGN PATENT DOCUMENTS

| | | |
|---|---|---|
| CN | 1422096 | 6/2003 |
| EP | 1 317 116 | 5/2005 |
| EP | 1 553 657 | 7/2005 |

* cited by examiner

*Primary Examiner*—Huyen D Le
(74) *Attorney, Agent, or Firm*—The Farrell Law Firm, LLP (57) ABSTRACT

A speaker device installed in an earpiece, for improving an antenna property in a wireless portable terminal is provided. The speaker device includes a housing, a magnet is installed on the housing, a diaphragm located a predetermined distance away over the magnet and includes a coil situated at a position corresponding to the magnet, and a cover covers the diaphragm and is in engagement with the housing, thereby forming a module. At least one inductor is provided at a feeding portion of the coil formed or installed on the diaphragm, thereby preventing the speaker device from resonating at a radio frequency (RF).

7 Claims, 8 Drawing Sheets

SPEAKER DEVICE FOR IMPROVING ANTENNA PROPERTY IN A WIRELESS PORTABLE TERMINAL

PRIORITY

This application claims priority under 35 U.S.C. § 119 to an application entitled "Speaker Device For Improving Antenna Property In A Wireless Portable Terminal" filed in the Korean Intellectual Property Office on Mar. 14, 2005 and assigned Ser. No. 2005-21006, the contents of which are incorporated herein by reference.

BACKGROUND OF THE INVENTION

1. Field of the Invention

The present invention relates generally to a speaker device for a wireless portable terminal, and more particularly, to a speaker device configured to prevent emitted resonant frequencies from degrading antenna radiation in a wireless portable terminal when the speaker is installed in the vicinity of an antenna device.

2. Description of the Related Art

The recent widespread use of wireless portable terminals, such as Personal Communication System (PCS) phones, Digital Communications Service (DCS) phones, Global Positioning System (GPS) terminals, Personal Digital Assistants (PDAs), cellular phones and wireless laptop computers, is a driving force behind the appearance of terminals with diverse functionalities and designs. Along with the trend towards smaller sized and reduced weight wireless communication terminals, there is also a trend towards including a variety of diverse functions in the terminals. These trends have attracted more consumer attention to wireless portable terminals and have resulted in a commensurate demand for wireless portable terminals. To meet these demands, developmental work has focused on the miniaturization of wireless portable terminals with existing functions maintained or enhanced.

For example, regarding an antenna device, a rod or whip antenna extended outward to a predetermined length and a helical antenna are vulnerable to damage when a terminal is dropped. Moreover, damaged antenna devices can cause problems that decrease portability of a wireless portable terminal. Accordingly, the use of a plate-type built-in antenna called an "internal antenna" or "intenna" has been increasing, and efforts have been made to improve assembly and productivity as well as to enhance the properties of the built-in antenna.

In the case of a folder-type terminal, a built-in antenna is installed typically in a folder. However, if a built-in antenna is disposed in a main body, degradation of an antenna property (such as an antenna transmission or reception quality) caused by a user's finger or hand touching the main body can frequently cause a mute phenomenon.

Moreover, since the built-in antenna is usually positioned in the vicinity of a speaker and/or superimposed with the speaker, a resonant frequency generated by the speaker during a call (i.e., during a speaker operation) can interfere with and adversely affect an antenna's radiation, thereby decreasing the call quality of the terminal.

Figure 1:
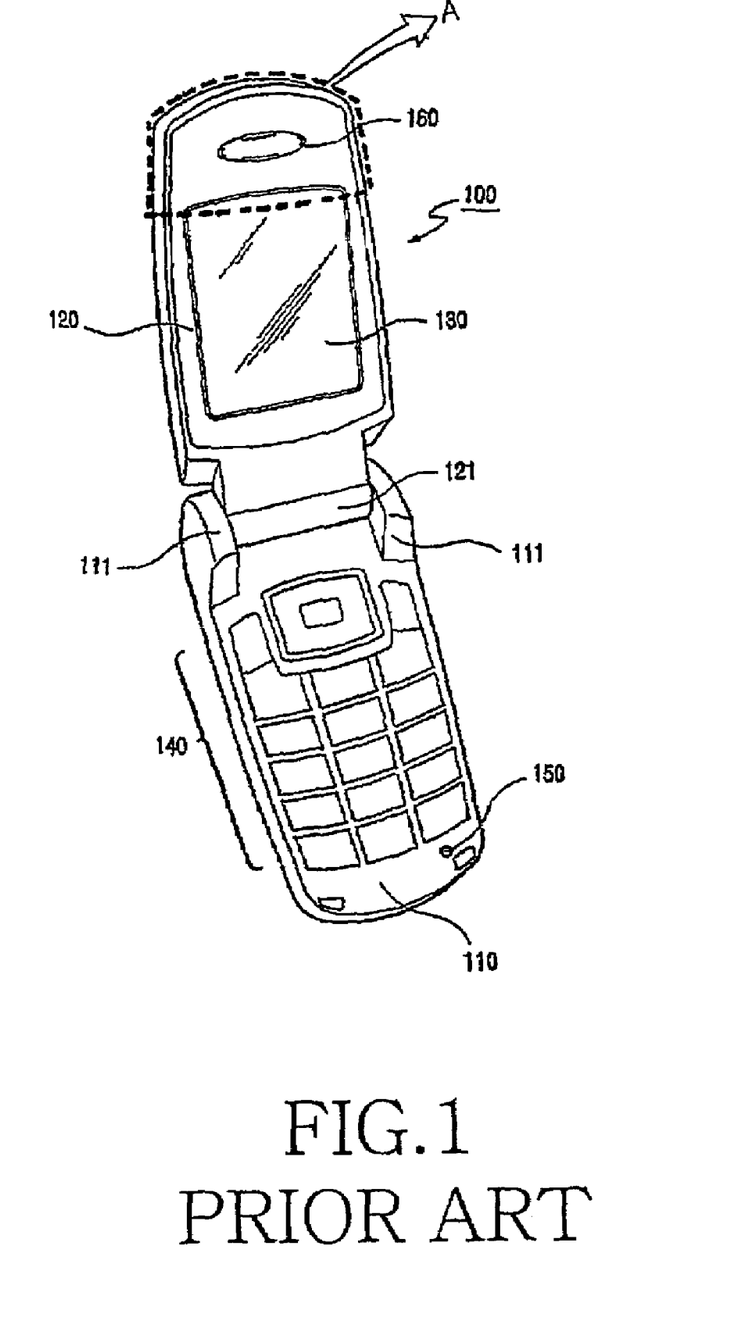
FIG. 1 is a perspective view showing a conventional wireless portable terminal with a speaker installation area marked.

FIG. 1 is a perspective view showing a wireless portable terminal having a built-in antenna module. Referring to FIG. 1, a terminal 100 includes a main body 110, a folder 120 attached to the main body 110 and configured to be opened from or closed to the main body 110 within a predetermined angle range (typically up to about 130 to 140 degrees) and a hinge module (not shown) for opening or closing the folder 120 from or to the main body 110.

A keypad assembly 140 including navigation keys is provided as a data input means on the main body 110. A microphone 150 for transmitting voice to the other party is disposed under the keypad assembly 140 in a lower portion of the main body 110.

A display 130 is provided as a data output means on the folder 120. An earpiece 160 is installed above the display 130, for reproducing audible sounds (e.g., voice from a calling party). Since the illustrated terminal 100 is equipped with a built-in antenna module, an antenna device extended outward is not provided. The built-in antenna module is positioned in a part A indicated by an arrow in the vicinity of the earpiece 160.

Accordingly, there is a need for a wireless portable terminal having an improved speaker device which does not interfere with the wireless portable terminal's antenna.

SUMMARY OF THE INVENTION

An object of the present invention is to substantially solve at least the above problems and/or disadvantages and to provide at least the advantages below.

Accordingly, an object of the present invention is to provide a speaker device configured to realize a predetermined antenna radiation during a call and thus improve antenna performance in a wireless portable terminal.

Another object of the present invention is to provide a speaker device configured to prevent the degradation of an antenna property arising from a speaker operation and thus improve antenna performance, through addition of a simple device to an existing speaker device in a wireless portable terminal.

A further object of the present invention is to provide a speaker device configured to reduce or entirely eliminate interference with an antenna property despite being installed in the vicinity of an antenna device in a wireless portable terminal.

Still another object of the present invention is to provide a speaker device configured to prevent the degradation of an antenna property arising from a speaker operation during a call and thus improve call quality in a wireless portable terminal.

The above objects are achieved by providing a speaker device installed in an earpiece, for improving an antenna property in a wireless portable terminal. The speaker device has a housing. A magnet is installed on the housing. A diaphragm is provided a predetermined distance away over the magnet, and has a coil at a position corresponding to the magnet. A cover covers the diaphragm, in engagement with the housing, thereby forming a module. At least one inductor is provided at a feeding portion of the coil formed or installed on the diaphragm, thereby preventing the speaker device from resonating in an RF band.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

A speaker device of the present invention is applicable to any wireless portable terminal. Also, it is to be appreciated that while the present invention is described in the context of a folder-type terminal, the present invention is applicable to all other terminals including a bar type, a slider type, a flip type, a flip-up type, etc., which have built-in antenna modules. Furthermore, while a terminal with a built-in antenna device is shown and described in the following description, the present invention is also applicable to any terminal having a retractable whip antenna or a helical antenna.

Figure 2:
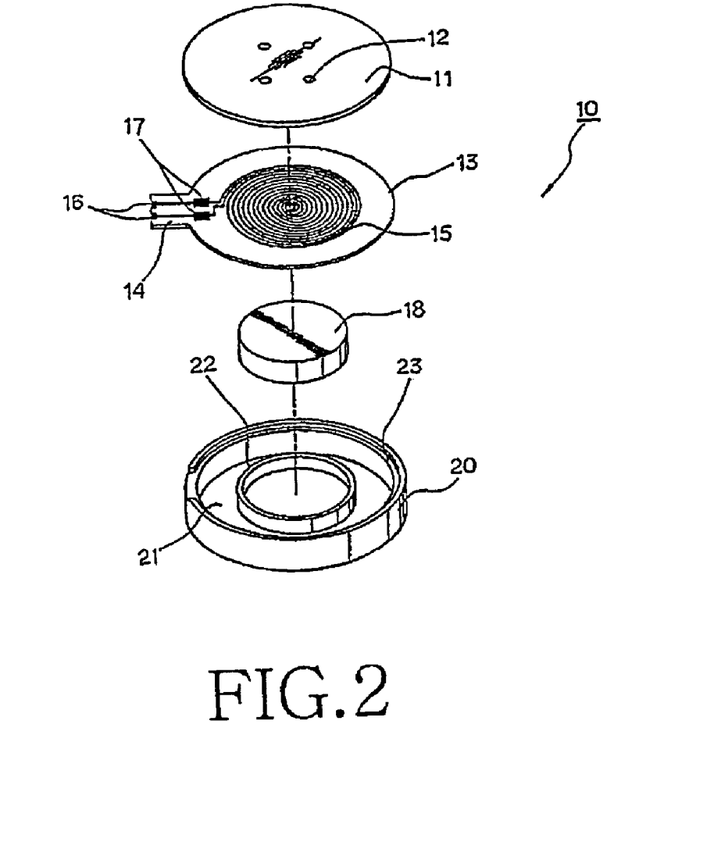
FIG. 2 is an exploded perspective view showing a speaker device according to an embodiment the present invention.
Figure 3:
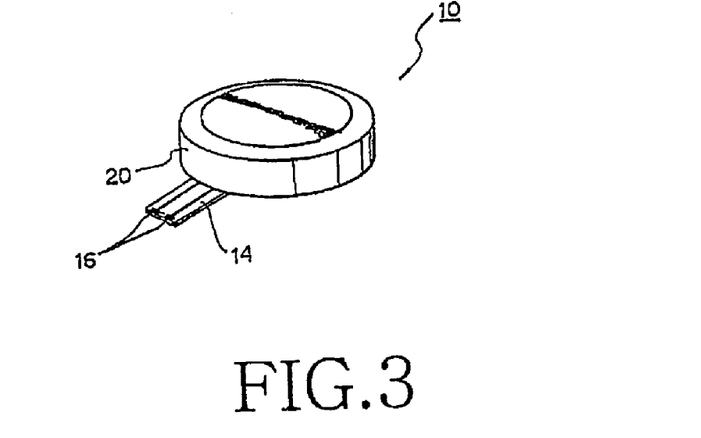
FIG. 3 is an assembled perspective view showing the speaker device according to an embodiment of the present invention.

FIG. 2 is an exploded perspective view showing a speaker device according to an embodiment of the present invention, and FIG. 3 is an assembled perspective view showing the speaker device according to an embodiment of the present invention. Referring to FIGS. 2 and 3, a speaker device 10 includes a housing 20 having a predetermined space defined therein, a magnet 18 fixed onto the bottom surface 21 of the housing 20, a diaphragm 13 is disposed a predetermined distance away from and over the magnet 18, and a cover 11 having a plurality of holes 12 thereon, is provided on the top of the housing 20.

A predetermined bushing 22 for locating and/or fixing the magnet 18 onto the housing 20 protrudes from the bottom surface 21 of the housing 20. The housing 20 may have a step 23 (e.g., a notch, cutout, etc.) at an inner sidewall thereof, for allowing the cover 11 to be mounted thereon.

A coil 15, wound a plurality of turns, is formed or installed on the diaphragm 13. According to the present invention, a flexible printed circuit (FBC) is used as the diaphragm 13 and the coil 15 is formed in such a manner that two wires are wound spirally at the center of the diaphragm 13. A portion 14 of the diaphragm 13 extends outward from the speaker device 10 and includes terminals 16 for electrically connected to a feeding portion of the wireless portable terminal (not shown), as illustrated in FIG. 3. Therefore, the two wires of the coil 15 serve as the input and output portions of the extended portion 16, respectively.

In alternative embodiments, the coil 15 may be wound a plurality of turns in the shape of a cylinder and attached onto the bottom surface of the diaphragm 13 situated toward the magnet 18.

Subsequently, inductors 17 are interposed at the input and output portions of the coil 15. The inductors 17 are serially connected to the coil 15, thereby avoiding resonance in a radio frequency (RF) band as encountered in a conventional speaker device. The inductors 17 are so configured as to have an appropriate inductance according to the output power and impedance of a selected speaker. Preferably, the inductors 17 have a low direct current (DC resistance, a large current capacity, and a high capacitance. While in the present embodiment, two inductors 17 are used at the input and output of the coil 15, the present invention is not limited to this configuration. For example, in alternative embodiments, the number and positions of the inductors 17 may vary depending on coupling between the speaker device and the antenna device during a speaker operation.

Figure 4A:
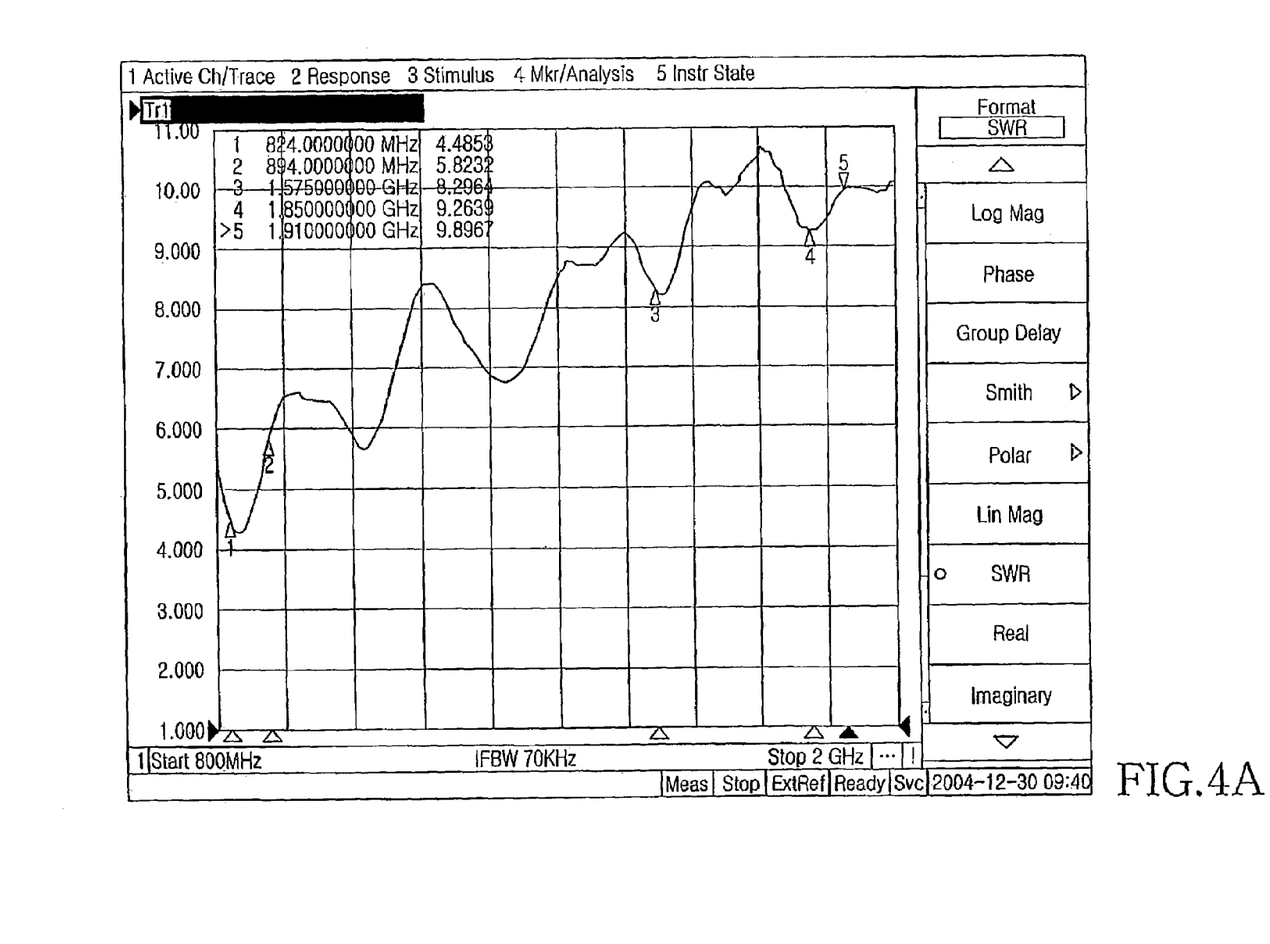
FIG. 4A is a graph illustrating the standing wave ratio (SWR) of a conventional speaker device.
Figure 4B:
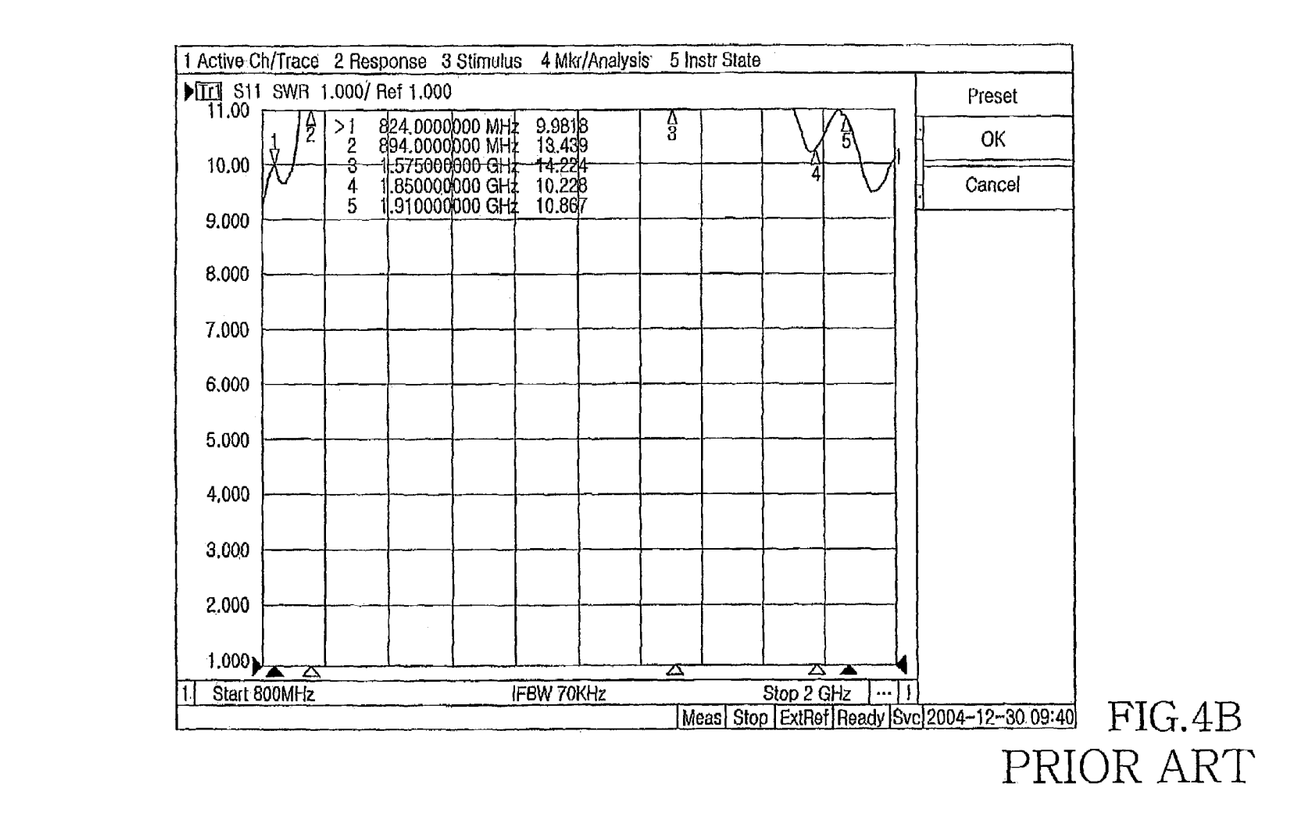
FIG. 4B is a graph illustrating the SWR of the speaker device according to the present invention.

FIGS. 4A and 4B are graphs respectively illustrating the SWRs of a conventional speaker device and the speaker device according to an embodiment of the present invention.

Referring to FIGS. 4A and 4B, as shown in FIG. 4A, the conventional speaker device resonates, compared to the speaker device including an inductor according to an embodiment of the present invention.

Figure 5A:
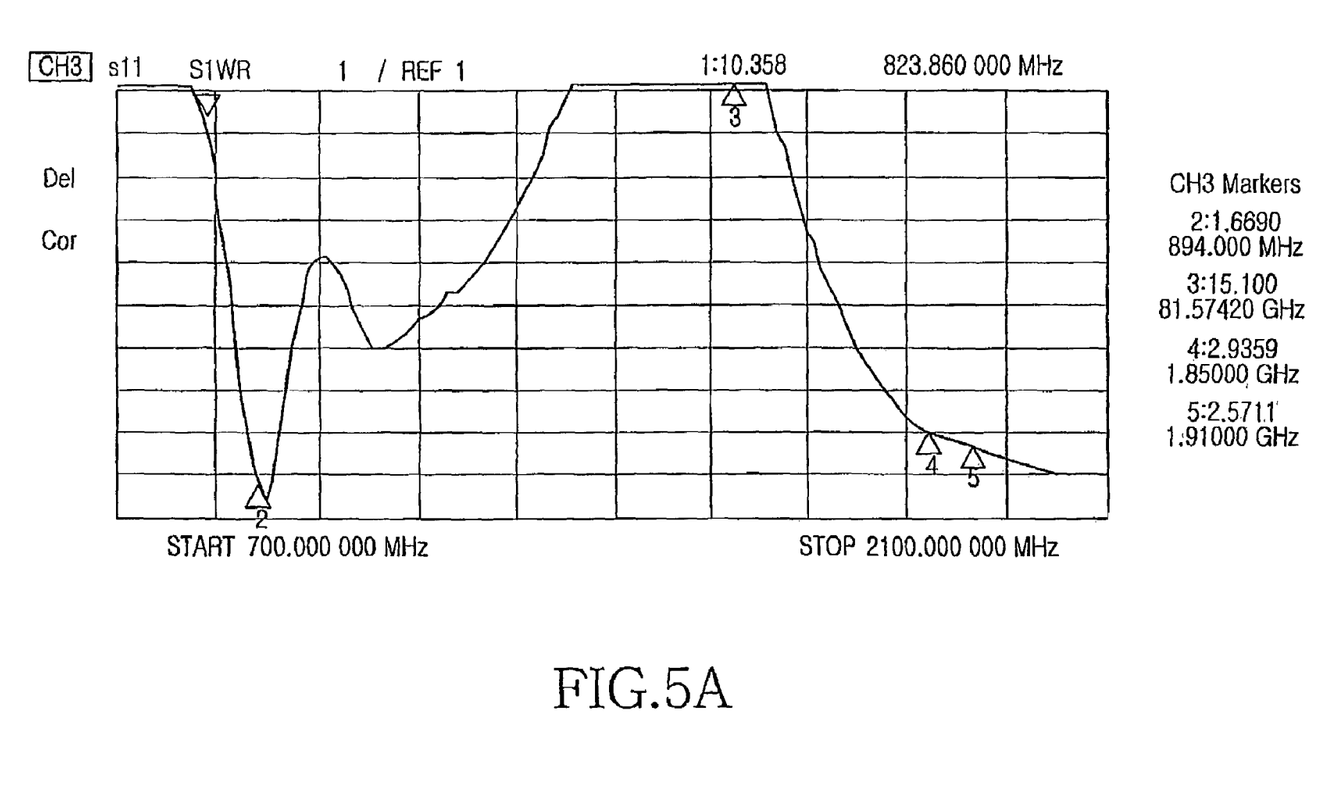
FIG. 5A is a graph illustrating the SWR of an antenna device installed in a wireless portable terminal without a speaker device.
Figure 5B:
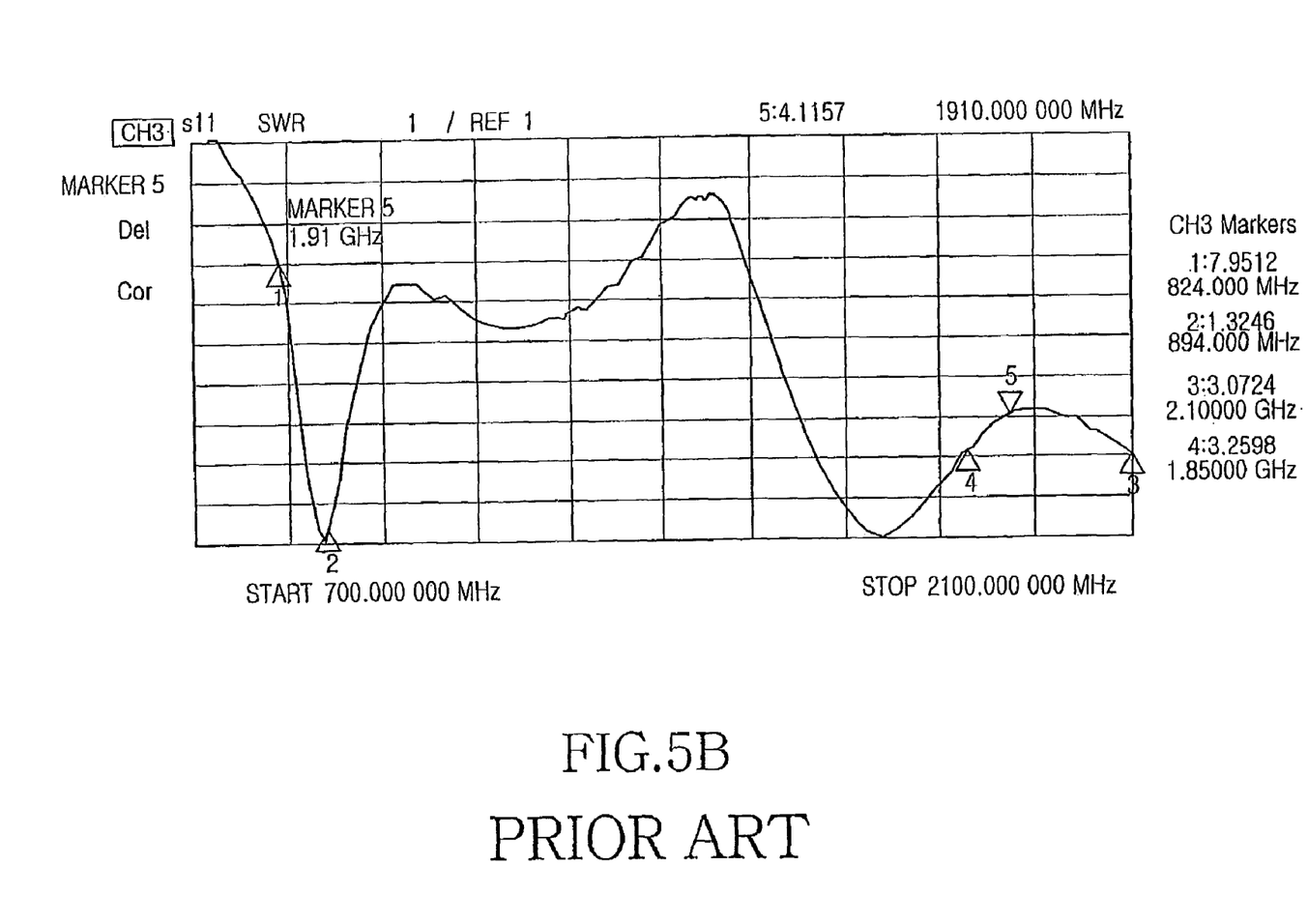
FIG. 5B is a graph illustrating the SWR of the antenna device in conjunction with a conventional speaker device in the wireless portable terminal.

FIG. 5A is a graph illustrating the SWR of an antenna device installed in a wireless portable terminal without a speaker device. FIG. 5B is a graph illustrating the SWR of the antenna device in conjunction with a conventional speaker device in the wireless portable terminal, and FIG. 5C is a graph illustrating the SWR of the antenna device in conjunction with a speaker device according to an embodiment of the present invention in the wireless portable terminal.

Figure 5C:
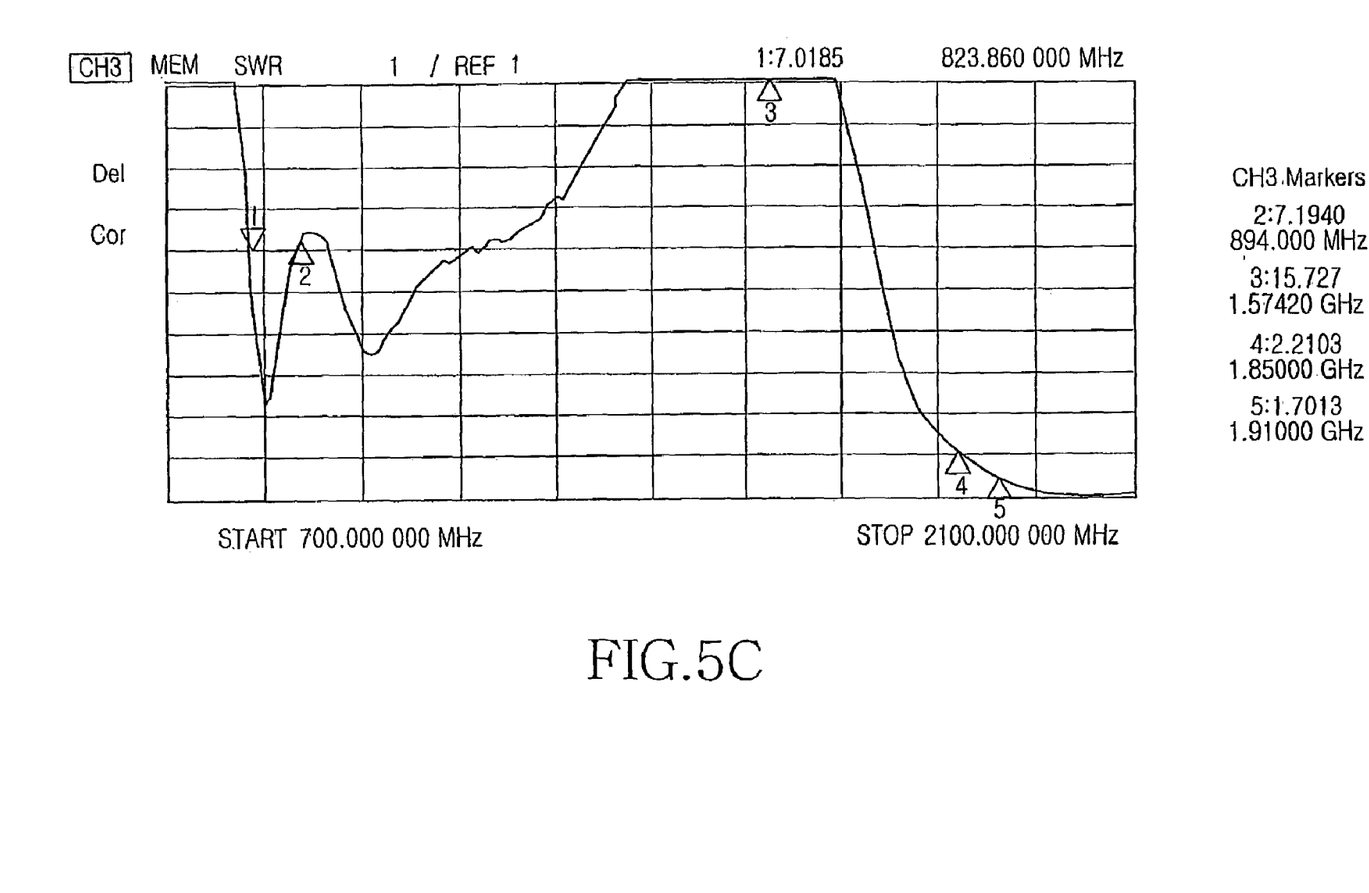
FIG. 5C is a graph illustrating the SWR of the antenna device in conjunction with a speaker device according to an embodiment of the present invention in the wireless portable terminal.

It is noted from a comparison of FIGS. 5A, 5B and 5C, that an antenna radiation property shown in FIG. 5C is similar to that shown in FIG. 5A. This implies that a constant antenna radiation is achieved even if the speaker device according to the present invention is provided in the vicinity of the antenna device.

Figure 6:
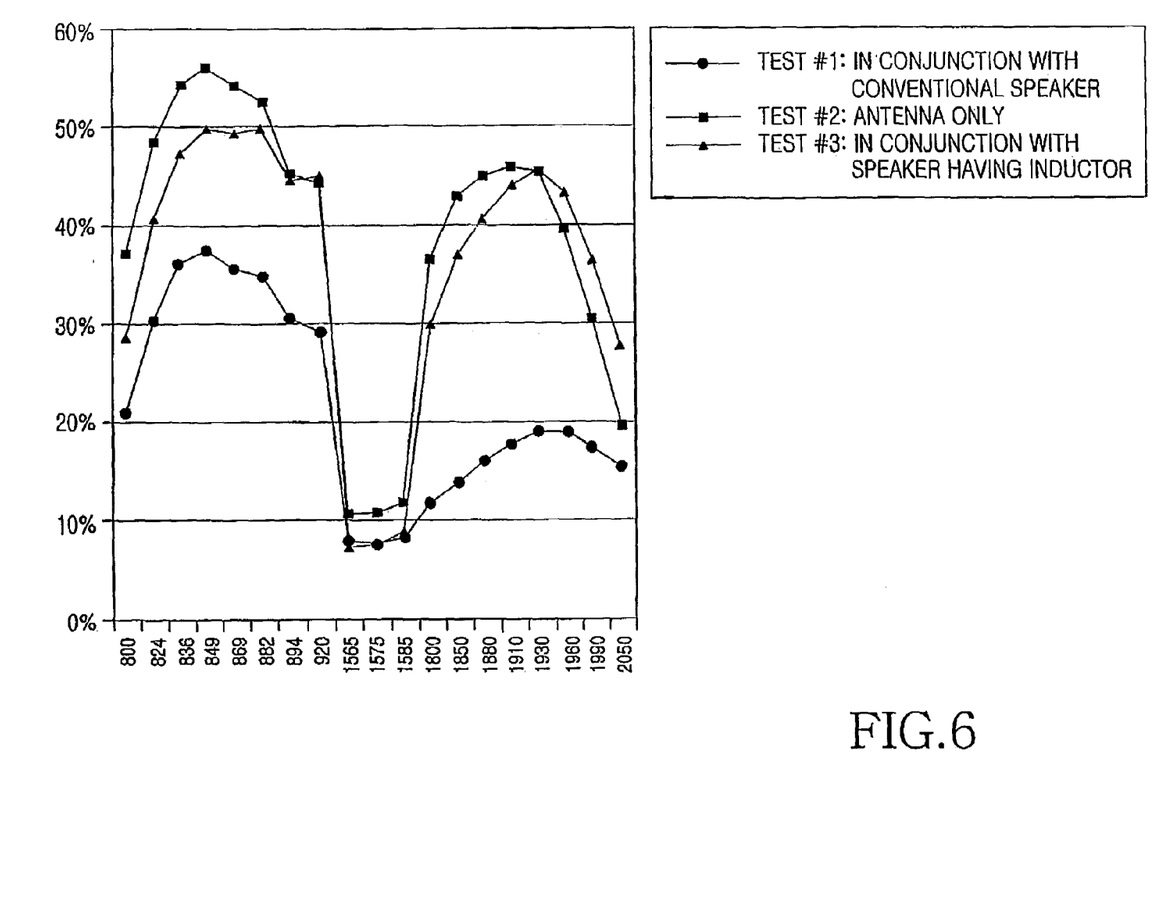
FIG. 6 is a graph comparing the conventional antenna device and the antenna device according to an embodiment of the present invention in terms of radiation efficiency.

FIG. 6 is a graph comparing the conventional antenna device and the antenna device according to an embodiment of the present invention in terms of radiation efficiency. As noted from FIG. 6, the radiation efficiency of the antenna device operating in conjunction with the speaker device of the present invention is close to that of the antenna device that operates alone (i.e., without being operated with a speaker device).

As described above, the speaker device according to the present invention does not affect the radiation of an antenna device through addition of a simple inductor, even if it is positioned in the vicinity of the antenna device. The resulting constant radiation property improves call quality in a wireless portable terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A speaker device installed at an earpiece, for improving an antenna property in a wireless portable terminal, comprising:

a housing;

a magnet installed in the housing;

a diaphragm provided a predetermined distance from the magnet, the diaphragm including a coil formed in a spiral and disposed on a surface of the diaphragm facing away from the magnet and at a position corresponding to the position of the magnet; and a cover located over the diaphragm and in engagement with the housing, thereby forming a module; and at least one inductor for preventing the speaker device from resonating in a radio frequency (RF) band, the at least one inductor being located at a feeding portion of the coil, and being formed or installed on the diaphragm.

2. The speaker device of claim 1, wherein a portion of the diaphragm extends outward from the housing and an end portion of the coil extends up to the extended portion of the diaphragm to serve as a feeding portion.

3. The speaker device of claim 2, wherein the at least one inductor is serially coupled to the coil.

4. The speaker device of claim 2, wherein the diaphragm is a flexible printed circuit (FPC) having two feeding wires formed spirally and extending to an extended portion of the FPC.

5. The speaker device of claim 2, wherein the coil includes two wires which are wound in a plurality of turns.

6. The speaker device of claim 5, wherein the at least one inductor is serially coupled to the coil.

7. The speaker device of claim 1, wherein the at least one inductor is serially coupled to the coil.

* * * * *